United States Patent
Egret et al.

(12) 
(10) Patent No.: US 6,528,135 B1
(45) Date of Patent: Mar. 4, 2003

(54) USE OF A STRUCTURE BASED ON POLY (DIMETHYLKETENE) AND OBJECTS COMPRISING THIS STRUCTURE

(75) Inventors: Hélène Egret, Oissel (FR); Claude Bunel, Bihorel (FR); Jean-Pierre Couvercelle, Fontaine le Bourg (FR); Michaël Werth, Bernay (FR); Yves Germain, Serquigny (DE)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/447,350

(22) Filed: Nov. 22, 1999

(30) Foreign Application Priority Data

Nov. 20, 1998 (FR) ............................................... 98 14926

(51) Int. Cl.⁷ ........................ C08F 16/36; C08F 116/36; C08F 67/02
(52) U.S. Cl. ..................... 428/36.6; 428/36.7; 428/480; 428/483; 428/524; 526/316
(58) Field of Search ............................. 428/36.6, 36.7, 428/480, 483, 524; 526/316

(56) References Cited

U.S. PATENT DOCUMENTS

| | | | |
|---|---|---|---|
| 3,321,441 A | 5/1967 | Cash et al. | 260/63 |
| 3,350,357 A | 10/1967 | Natta et al. | 260/63 |
| 3,917,546 A | 11/1975 | Vogl | 260/2.5 F |
| 3,932,318 A | 1/1976 | Vogl | 260/2.5 F |
| 5,077,385 A | * 12/1991 | Gerlowski et al. | 528/392 |
| 5,859,138 A | * 1/1999 | Bonner et al. | 525/185 |

FOREIGN PATENT DOCUMENTS

| | | |
|---|---|---|
| EP | 0 816 067 | 1/1998 |
| GB | 987370 | 3/1965 |

\* cited by examiner

*Primary Examiner*—Sandra M. Nolan
(74) *Attorney, Agent, or Firm*—Millen, White, Zelano & Branigan, P.C.

(57) ABSTRACT

A structure comprising at least one layer of a polymer (A) comprising:

the units (A1)

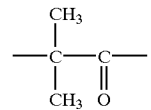

and the units (A2)

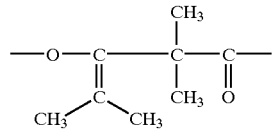

wherein the A2/(A1+A2) molar ratio is between 0 and 30% is a barrier against oxygen permeation under high relative humidity, making the structure useful for packaging and hollow bodies, such as pipes, bottles and containers.

21 Claims, No Drawings

USE OF A STRUCTURE BASED ON POLY (DIMETHYLKETENE) AND OBJECTS COMPRISING THIS STRUCTURE

FIELD OF THE INVENTION

The present invention relates to the use of a structure based on poly(dimethylketene) and to the objects comprising this structure.

More specifically, the invention relates to the use of a structure comprising at least one layer of a polymer (A) comprising:

the units (A1)

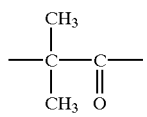

and the units (A2)

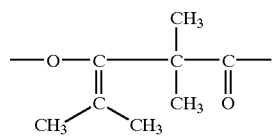

such that the A2/(A1+A2) molar ratio is between 0 and 30%.

The prior art GB 893,308 discloses polymers comprising 81.6% by weight of units (A1) obtained by polymerization of dimethylketene

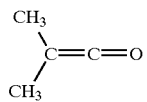

in the presence of aluminium bromide. The polymer powder thus obtained is subjected to successive extractions with various solvents at boiling point, namely acetone, ether and toluene. There remains 81.6% of the starting polymer which cannot be extracted with toluene, its melting temperature being 255° C. Diffraction shows a crystalline structure. These polymers were not converted into films.

The prior art U.S. Pat. No. 3,321,441 discloses the polymerization of dimethylketene in the presence of a strong base and the production of a polymer composed of units (A2).

None of these documents discloses the barrier properties of films of polymer (A). It has now been discovered that films made of polymer (A) are good barriers to gases, to hydrocarbons and to petrols for cars.

It has also been discovered that films made of polymer (A) of the invention are very good barriers to oxygen and that this property is not very sensitive to the relative humidity (RH). Films made of EVOH, a copolymer of ethylene and of vinyl alcohol (also known as saponification products of copolymers of ethylene and of vinyl acetate), have an oxygen barrier level of the same order as those composed of the polymer (A), provided that the relative humidity does not exceed 50%. Beyond 50% RH, EVOH to a large extent loses its barrier properties.

The structure used in the invention can be monolayer, that is to say be only one layer of the polymer (A).

The structure used in the invention can be multilayer, that is to say that it comprises at least one layer of the polymer (A) and at least one layer of the polymer (B), it being possible for a binder to be positioned between the layers (A) and (B).

According to another form, the structure used in the invention can respectively comprise a polymer (C), the polymer (A) and a polymer (B), it being possible for a binder to be positioned between the layers (C) and (A) and/or between the layers (A) and (B).

The monolayer structure of the invention can be a film.

The present invention also relates to the objects manufactured with any one of the preceding mono- or multilayer structures.

The present invention also relates to packagings and hollow bodies, such as pipes, bottles and containers, comprising any one of the preceding structures. The packagings are, for example, bags and sachets which are obtained with the said mono- or multilayer structures existing in the form of a mono- or multilayer film. Particularly advantageous hollow bodies are petrol tanks for cars. These tanks can have a structure such that the layer of polymer (A) is either in direct contact with the petrol or is not in direct contact with the petrol. Particularly advantageous pipes are those used to convey petrol in service stations between the storage tanks and the tankers from which these tanks are filled or the pipes which connect the storage tanks and the pumps for distribution to vehicles, such as cars. Other particularly advantageous pipes are those which transfer petrol between the tank of the car and the engine. Other particularly useful pipes are those in which the polymer (A) is the external layer; they can be incorporated in the floors and walls of habitations in order to provide heating thereto.

The invention will now be described in detail.

Dimethylketene can be obtained by the pyrolysis of isobutyric anhydride. This synthesis has been disclosed in Patents GB 965,762, FR 1,381,831 and U.S. Pat. No. 3,201,474. It has also been described in the following articles:

M. Mugno, M. Bornengo, *Chim. Ind.* (Milan 46, 1, 5–9, 1964)

G. F. Pregaglia, M. Binaghi, *Makromol. Syn.*, 3, 150–160, 1968.

This pyrolysis can be carried out between 550° C. and 675° C. under an absolute pressure of between 30 and 40 mm Hg (3960 and 5280 Pa).

The polymerization of the dimethylketene to produce the polymer (A) can be carried out in the presence of a catalyst of formula $Al(R_1)_{3-m}X_m$ in which X is a halogen atom $R_1$ denotes an alkyl, aryl, cycloalkyl or alkoxy group or a hydrogen atom.

Mention may be made, by way of examples, of $AlCl_2C_2H_5$, $AlCl(C_2H_5)_2$, $AlC_6H_5Cl_2$, $Al(OC_3H_7)Br_2$, $AlBr_3$, $AlCl_3$ or their dimers or the sesquihalides of the type $AlC_2H_5Cl_2.Al(C_2H_5)_2Cl$.

Use may also be made of another catalyst, such as an organometallic compound of a metal from the second column of the Table of the Elements or the complexes of these compounds with ethers. Mention may be made, for example, of dialkylberylliums, alkylberyllium monohalides, dialkylmagnesiums, alkylmagnesium monohalides, dialkylzincs and alkylzinc monohalides. The polymerization can be carried out between −100° C. and +40° C., optionally in the presence of a solvent, provided the solvent does not react with the monomer and does not decompose the catalyst. Mention may be made, by way of examples, of aliphatic, cyclic or aromatic hydrocarbons and solvents having a high dielectric constant, such as nitrobenzene, dichloromethane, 1,1,1,2-tetrachloroethane and 1,1-dichloroethylene. This polymerization is also disclosed in GB 987,370 and GB 893,908, the contents of which are incorporated in the present application. It is also described in the following articles:

G. F. Pregaglia, M. Peraldo, M. Binaghi, *Gazz. Chim. Ital.*, 92, 488–500, 1962.

G. F. Pregaglia, M. Binaghi, *Makromol. Syn.*, 3, 150–165, 1968.

G. Natta, G. Mazzanti, G. F. Pregaglia, M. Binaghi, M. Peraldo, *J. Am. Chem. Soc.*, Vol. 82, 4742–4743, 1960.

It would not be departing from the scope of the invention if the polymer (A) also contained units (A3)

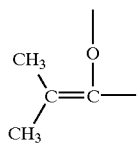

it being possible for the content of (A3) to be from 0 to 5 mol per 100 mol of (A1).

The proportion of (A2) in the polymer (A) depends on the polymerization conditions, in particular on the polarity of the solvent.

The proportion of (A2) is usually (in moles) from 5 to 15%.

The polymer (A) is thermoplastic and has the following properties:

thermal decomposition: beginning of decomposition from 300° C. without stabilizer, obtained by thermogravimetry at 10° C./min.

relative density: 1.28 melting temperatures at 230 and 255° C., peak measured by differential enthalpy analysis (20° C./min under nitrogen).

intrinsic viscosity in solution at 20° C.: from 0.5 to 3 (for a 0.5 g/dl solution in meta-cresol).

The polymer (A) can be converted into a film by the usual means for thermoplastics, such as the blown-film process, pressing, calendering or slot die extrusion. Hollow bodies made of (A) can be produced by extrusion (pipes) or extrusion blow-moulding for hollow bodies.

Films made of polymer (A) and with a thickness of 5 to 150 $\mu$m have a variation in the permeability to oxygen (measured according to ASTM Standard D 3985-81) as a function of the relative humidity (RH) such that:

the permeability at 75% RH/permeability at 0% RH ratio is between 1.2 and 2;

the permeability at 95% RH/permeability at 0% RH ratio is between 1.4 and 2.5.

For EVOH, these values are between 4 and 15 and between 8 and 20 respectively.

The permeability is expressed in cm$^3$ per m$^2$ for 24 hours for a pressure difference of 10$^5$ Pa and for a given thickness.

To compare films of different thicknesses, the thickness is corrected in proportion (permeability×thickness=constant).

The permeability to oxygen in cm$^3$/m$^2$, 24 h, 10$^5$ Pa, 70 $\mu$m, is of the order of: 0.15 to 0.20 at 23° C. and 0% RH 0.2 to 1 at 23° C. and 75% RH.

These values decrease as the proportion of (A2) in (A) decreases.

Polymer (B)

With regard to multilayer structures, the polymer (B) can be chosen, for example, from polyolefins, polystyrenes, polyamides, polycarbonate, PVC, PVDF and saturated polyesters, such as PET and PBT.

Mention may be made, by way of examples, of the structures:

(A)/PA-6, (A)/(PA-6,6), (A)/(PA-6/6,6), (A)/PA-11, (A)/PA-12, (A)/PE or (A)/polypropylene.

These structures have respective thicknesses of, for example, 5 to 30 $\mu$m/15 to 100 $\mu$m, if they are flexible films for the manufacture of sachets.

With regard to coextruded pipes, the thicknesses can be 5 to 10,000 $\mu$m/0.5 to 5 mm.

With regard to hollow bodies, the thicknesses depend on the volume and can be several millimeters. It is recommended to position a binder between the layers (A) and (B).

Binders

Mention may be made, by way of examples of binder, of:

polyethylene, polypropylene, copolymers of ethylene and of at least one $\alpha$-olefin, or mixtures of these polymers, all these polymers being grafted with unsaturated carboxylic acid anhydrides, such as, for example, maleic anhydride. Use may also be made of mixtures of these grafted polymers and of these ungrafted polymers.

copolymers of ethylene with at least one product chosen from (i) unsaturated carboxylic acids, their salts or their esters, (ii) vinyl esters of saturated carboxylic acids, (iii) unsaturated dicarboxylic acids, their salts, their esters, their hemiesters or their anhydrides, or (iv) unsaturated epoxides, it being possible for these copolymers to be grafted with unsaturated dicarboxylic acid anhydrides, such as maleic anhydride, or unsaturated epoxides, such as glycidyl methacrylate.

It is also possible to add, to one or to each of the layers, a product which improves their adhesion, without having to use a binder layer. This product can be the binder described hereinabove.

Examples of binders are disclosed in Patents EP 802,207, EP 816,460, EP 837,080 and EP 742,236.

With regard to (A)/binder/polyolefin structures, particularly useful binders are those disclosed in EP 816,067 and used for structures having a polyketone layer of formula

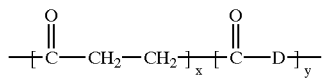

in which D denotes an unsaturated monomer having at least 3 carbon atoms, the x/y ratio being at least 2.

The

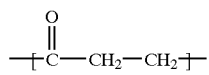

and

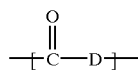

units are distributed randomly in the polyketone chain.

The number-average molar masses can be between 1000 and 200,000, advantageously between 20,000 and 90,000

(measured by gel permeation chromatography). The melting temperatures can be between 175 and 300° C., generally between 200 and 270° C.

Syntheses of these polyketones are disclosed in U.S. Pat. Nos. 4,843,144, 4,880,903 and 3,694,412.

The binder can be:

either a thermoplastic polymer comprising at least one hydroxyl functional group which can be a copolymer having a hydroxyl functional group, a mixture of polymers each having at least one hydroxyl functional group or a mixture of a polymer having at least one hydroxyl functional group with another polymer or any other combination, or a thermoplastic polymer comprising at least one epoxide functional group which can be a polymer having an epoxide functional group, a mixture of polymers each having at least one epoxide functional group or a mixture of a polymer having at least one epoxide functional group with another polymer or any other combination, or a thermoplastic polymer comprising ethylene units and at least one alkyl (meth)acrylate unit.

With regard to (A)/binder/polyamide structures, binders which are particularly used are copolyamides. Mention may be made, for example, of:

PA-6/6,6, copolymer of caprolactam, of hexamethylenediamine and of adipic acid

PA-6/6,6/12, copolymer of caprolactam, of hexamethylenediamine and of adipic acid, and of lauryllactam PA-6/12, copolymer of caprolactam and of lauryllactam PA-6,12, copolymer of hexamethylenediamine and of dodecanedioic acid.

With regard to (C)/(A)/(B) structures, the polymer (C) can be chosen from the polymers cited for (B).

EXAMPLE 1

15.2 g of dimethylketene are distilled under reduced pressure into a tubular reactor with a volume of 250 cm$^3$ cooled with liquid nitrogen. The reactor is equipped with a 100 cm$^3$ dropping funnel and the homogeneity of the medium is provided by a magnetic stirring system. The reactor is subsequently placed in an acetone Dewar flask, the temperature of which is regulated at −30° C. The reactor is placed under a flow of nitrogen. 38 cm$^3$ of carbon tetrachloride are then slowly added to the medium and, when the mixture has stabilized at the temperature of the bath, 2.5 cm$^3$ of a 0.86M aluminium tribromide solution, that is to say 2.23 g in 10 cm$^3$ of nitrobenzene, are introduced. The reaction mixture is left for 5 hours at −30° C. and then overnight in the reactor, the cooling of which has been halted. After 19 hours, the reaction is halted by the addition of 20 cm$^3$ of methanol and the polymer is precipitated from 200 cm$^3$ of methanol and 4 cm$^3$ of hydrochloric acid.

The polymer is filtered off and washed with a methanol and hydrochloric acid mixture and then with methanol alone. It is subsequently dried under reduced pressure at room temperature for at least 48 hours.

8.32 g of polymer are obtained, the structure of which is confirmed by infrared and $^{13}$C NMR spectroscopy. It is a polymer (A) containing 95% of units (A1) and 5% (in moles) of units (A2).

EXAMPLE 2

11.4 g of dimethylketene are distilled onto cold walls. According to the same procedure as that described in Example 1, 28 cm$^3$ of CH$_2$Cl$_2$ and then 1.9 cm$^3$ of a 0.87 M AlBr$_3$ solution, that is to say 2.32 g in 10 cm$^3$ of nitrobenzene, are added. After reacting for 4 hours, 25 cm$^3$ of methanol are added and the polymer is precipitated from 200 cm$^3$ of methanol and 4 cm$^3$ of 37% HCl.

5.73 g of polymer (A) comprising 10 mol % of units (A2) are obtained.

Example 1 is repeated, in order to prepare 15 g of polymer (A) comprising 95 mol % of units (A1) and 5% by weight of units (A2), and then two films are manufactured:

A film with a thickness of 69 μm is manufactured by compressing and melting the polymer powder between two steel sheets. The permeability is measured in Example 4.

A film with a thickness of 70 μm is manufactured by the same method. The permeability is measured in Example 5.

Films made of polymer (A) are, compared with films made of EVOH.

EVOH D denotes a copolymer of ethylene and of vinyl alcohol comprising 29 mol % of ethylene with an MFI of 4 at 190° C. under 2.16 kg.

EVOH E denotes a copolymer of ethylene and of vinyl alcohol comprising 38 mol % of ethylene with an MFI of 4 at 190° C. under 2.16 kg.

|  | Thickness of the film (μm) | O$_2$ permeability | | |
| --- | --- | --- | --- | --- |
|  |  | 23° C. 0% RH | 23° C. 75% RH | 23° C. 95% RH |
| Example 4 | 69 | 0.18 | 0.35 |  |
| Example 5 | 70 | 0.14 | 0.19 | 0.2 |
| Example 4 | 25 | 0.50 | 0.97 |  |
| Example 5 | 25 | 0.39 | 0.53 | 0.56 |
| EVOH D | 25 | 0.10 | 1.41 | 6.00 |
| EVOH E | 25 | 0.70 | 3.10 | 6.00 |

Thus, it is seen that it is contemplated that the present invention can be used for the same purposes as EVOH D and EVOH E, while at the same time providing substantially better resistance to oxygen in loci having higher relative humidities. Consequently, an aspect of the invention involves a method of preventing oxygen from permeating through a barrier film, comprising placing the barrier film in a locus wherein oxygen is present, optionally at high relative humidities, the improvement comprising employing as the barrier film at least one layer of polymer (A).

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding French application 98/14.926, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a method of preventing oxygen from permeating through a barrier film, comprising placing said barrier film in a locus wherein oxygen is present, the improvement comprising employing as said barrier film at least one layer of a polymer (A) comprising repeating units of:

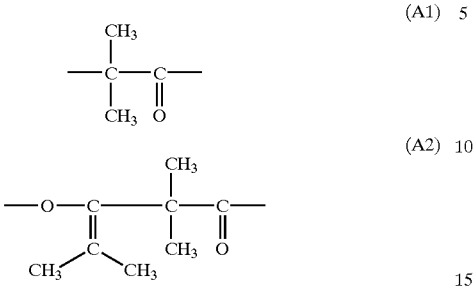

wherein the A2/(A1+A2) molar ratio of the units (A1) and (A2) is between 0 and 30%, and wherein the permeability of said layer to $O_2$ at 75% RH/permeability to $O_2$ at 0% RH ratio is between 1.2 and 2.

2. A method according to claim 1, in which the polymer (A) contains a proportion of (A2) of between 10 and 15%.

3. A method according to claim 1, in which the polymer (A) contains a proportion of (A2) of between 5 and 10%.

4. A method according to claim 1, wherein said layer has a thickness of 5–150 μm.

5. A method according to claim 1, wherein said at least one layer (A) further comprises not more than 5 mol per 100 mol of (A1) of repeating units of (A3):

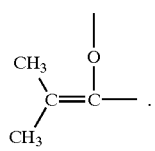

6. A method according to claim 1, wherein said locus has a relative humidity (RH) of at least 50%.

7. A method according to claim 1, wherein said barrier film has a multilayer structure comprising at least one layer of the polymer (A) and at least one layer of a polymer (B), and said polymer (B) is a polyolefin, polystryrene, a polyamide, a polycarbonate, a polymer of vinyl chloride, or a saturated polyester.

8. A method according to claim 7, wherein polymer (B) is a polyamide, a polypropylene or a polyethylene.

9. A method according to claim 7, wherein said at least one layer of polymer (A) has a thickness of 5 to 30 μm, and said at least one layer of polymer (B) has a thickness of 15 to 100 μm.

10. A method according to claim 7, wherein a binder is positioned between layers (A) and (B).

11. A method according to claim 7, wherein said barrier film is a multilayer laminate comprising a polymer (C), the polymer (A) and the polymer (B), polymer (A) being positioned between polymers (C) and (B) and optionally a binder positioned between the layers (C) and (A) and/or between the layers (A) and (B), polymer (C) being a polyolefin, polystyrene, a polyamide, a polycarbonate, a polymer of vinyl chloride of vinyl chloride, or a saturated polyester.

12. A method according to claim 7, wherein said layer of a polymer (A) has a thickness of 5–150 μm.

13. A method according to claim 11, wherein said layer of a polymer (A) has a thickness of 5–150 μm.

14. A method according to claim 1, in which the polymer (A) contains a proportion of (A2) of between 5 and 30%.

15. In a method of preventing oxygen from permeating through a barrier film, comprising placing said barrier film in a locus wherein oxygen is present, the improvement comprising employing as said barrier film at least one layer of a polymer (A) comprising repeating units of:

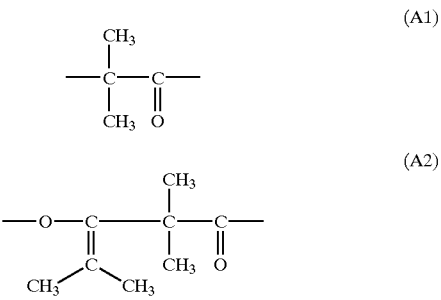

wherein the A2/(A1+A2) molar ratio of the units (A1) and (A2) is between 0 and 30%, and wherein the permeability of said layer to $O_2$ expressed in $cm^3/m^2$, 24 h, $10^5$ Pa, 70 μm, is between 0.15 and 0.20 at 23° C. and 0% RH.

16. In a method of preventing oxygen from permeating through a barrier film, comprising placing said barrier film in a locus wherein oxygen is present, the improvement comprising employing as said barrier film at least one layer of a polymer (A) comprising repeating units of:

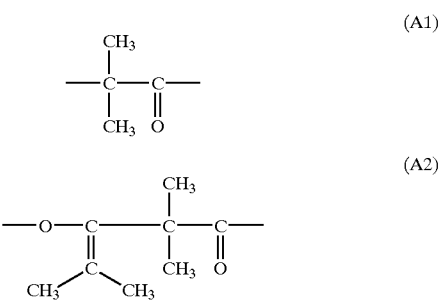

wherein the A2/(A1+A2) molar ratio of the units (A1) and (A2) is between 0 and 30%, and wherein the permeability of said layer to $O_2$ at 95% RH/permeability to $O_2$ at 0% RH ratio is between 1.4 and 2.5.

17. In a method of preventing oxygen from permeating through a barrier film, comprising placing said barrier film in a locus wherein oxygen is present, the improvement comprising employing as said barrier film at least one layer of a polymer (A) comprising repeating units of:

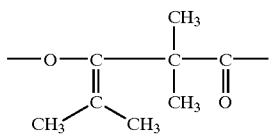 (A2)

wherein the A2/(A1+A2) molar ratio of the units (A1) and (A2) is between 0 and 30%, and wherein the permeability of said layer to $O_2$ expressed in $cm^3/m^2$, 24 h, $10^5$ Pa, 70 μm, is 0.2 to 1 at 23° C. and 75% RH.

18. In a method of preventing oxygen from permeating through a barrier film, comprising placing said barrier film in a locus wherein oxygen is present, the improvement comprising employing as said barrier film at least one layer of a polymer (A) comprising repeating units of:

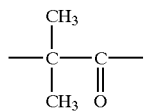 (A1)

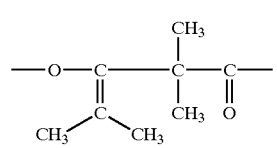 (A2)

wherein the A2/(A1+A2) molar ratio of the units (A1) and (A2) is between 0 and 30%, and wherein the permeability of said layer to $O_2$ at 75% RH/permeability to $O_2$ at 0% RH ratio is between 1.2 and 2 when measured at a layer thickness of 5 to 150 μm.

19. A method according to claim 18, wherein said layer has a thickness of 5 to 10,000 μm.

20. A method according to claim 18, wherein said layer has a thickness of 5 to 30 μm.

21. A method according to claim 18, wherein said layer has a thickness of 5 to 150 μm.

* * * * *

UNITED STATES PATENT AND TRADEMARK OFFICE
CERTIFICATE OF CORRECTION

PATENT NO.   : 6,528,135 B1
DATED        : March 4, 2003
INVENTOR(S)  : Helene Egret et al.

It is certified that error appears in the above-identified patent and that said Letters Patent is hereby corrected as shown below:

<u>Title page,</u>
Item [75], Inventors, read "Serquigny (DE)" should read -- Serquigny (FR) --

<u>Column 7,</u>
Line 44, reads "polystryene" should read -- polystyrene --
Line 62, reads "polymer of vinyl chloride of vinyl chloride," should read -- polymer of vinyl chloride, --

Signed and Sealed this

Twenty-fifth Day of May, 2004

JON W. DUDAS
*Acting Director of the United States Patent and Trademark Office*